United States Patent
Frank et al.

(10) Patent No.: US 10,065,267 B2
(45) Date of Patent: Sep. 4, 2018

(54) TOOL-CHANGING CARRIER AND TOOL SYSTEM

(76) Inventors: Joerg Frank, Duesseldorf (DE);
Sascha Bausch, Aachen (DE); Dominic Deutges, Krefeld (DE)

( * ) Notice: Subject to any disclaimer, the term of this patent is extended or adjusted under 35 U.S.C. 154(b) by 1035 days.

(21) Appl. No.: 13/261,705

(22) PCT Filed: Feb. 3, 2012

(86) PCT No.: PCT/EP2012/051841
§ 371 (c)(1),
(2), (4) Date: Nov. 12, 2013

(87) PCT Pub. No.: WO2012/104407
PCT Pub. Date: Aug. 9, 2012

(65) Prior Publication Data
US 2014/0059823 A1 Mar. 6, 2014

(30) Foreign Application Priority Data
Feb. 4, 2011 (DE) .................. 10 2011 000 505

(51) Int. Cl.
*B23K 26/00* (2014.01)
*B23P 23/04* (2006.01)
(Continued)

(52) U.S. Cl.
CPC .......... *B23K 26/0093* (2013.01); *B23B 29/24* (2013.01); *B23B 29/242* (2013.01);
(Continued)

(58) Field of Classification Search
CPC . B23P 25/006; B23K 26/0093; B23K 26/064; B23K 26/00; B23K 26/70;
(Continued)

(56) References Cited

U.S. PATENT DOCUMENTS 4,825,034 A    4/1989   Auvert et al.
4,825,036 A *  4/1989   Bickel .................... B23K 26/02
                                              219/121.63

(Continued)

FOREIGN PATENT DOCUMENTS

DE    4113633 A1    10/1992
DE    4326236       2/1995
(Continued)

OTHER PUBLICATIONS

Google Machine Translation of DE9419673—"Laseranordnung für Drehmaschine," Feb. 9, 1995.*

(Continued)

*Primary Examiner* — Erica E Cadugan
*Assistant Examiner* — Michael Vitale
(74) *Attorney, Agent, or Firm* — David C Purdue

(57) ABSTRACT

A tool-changing carrier, that is to say a tool turret (1) with a rotary turret unit having at least two tool mounts (9) and arranged such that it can be rotated relative to a basic turret body (12), has radiation-transmission means which are provided for passing electromagnetic radiation through the tool-changing carrier or along the same. A tool system comprises such a tool-changing carrier and at least two tool heads (3, 5, 15, 17, 18, 27, 34, 40, 43), intended for fixing on the tool mounts (9), wherein at least one tool head is an optical tool head (3, 15, 17, 18) which is suitable for exposing a workpiece (11) to electromagnetic radiation and has a tool optics unit (23) for deflecting and/or forming the electromagnetic radiation.

11 Claims, 5 Drawing Sheets

Figure 1:
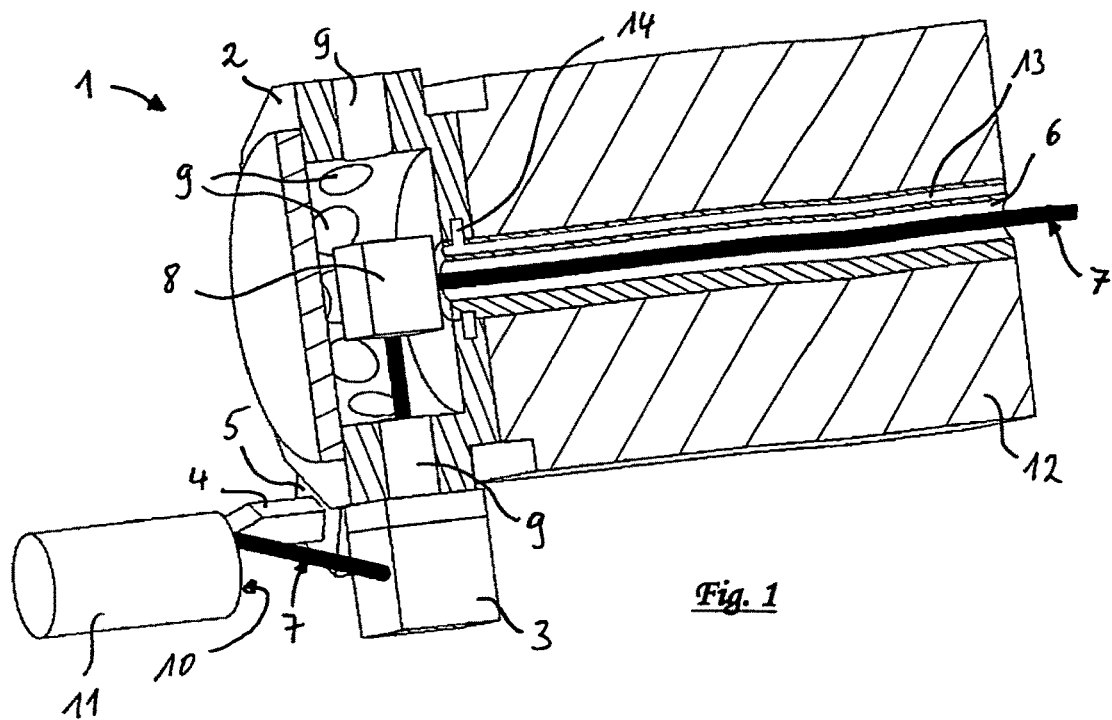

(51) Int. Cl.
*B23B 29/32* (2006.01)
*B23Q 39/02* (2006.01)
*B23B 29/24* (2006.01)
*B23P 25/00* (2006.01)
*B23K 26/70* (2014.01)
*B23Q 39/00* (2006.01)

(52) U.S. Cl.
CPC .............. *B23K 26/00* (2013.01); *B23P 23/04* (2013.01); *B23P 25/006* (2013.01); *B23Q 39/02* (2013.01); *B23B 2260/092* (2013.01); *B23K 26/70* (2015.10); *B23Q 2039/004* (2013.01); *Y10T 29/5154* (2015.01)

(58) Field of Classification Search
CPC .............. B23B 2260/092; B23Q 39/02; B23Q 2039/004; Y10T 29/5154
USPC ................ 29/39; 219/121.63, 121.67, 121.76
See application file for complete search history.

(56) References Cited

U.S. PATENT DOCUMENTS

| | | | |
|---|---|---|---|
| 5,008,510 A | 4/1991 | koseki | |
| 5,149,937 A | 9/1992 | Babel et al. | |
| 5,160,824 A | 11/1992 | Babel | |
| 5,225,650 A | 7/1993 | Babel et al. | |
| 5,376,061 A | 12/1994 | Suzuki | |
| 5,938,953 A * | 8/1999 | Jurca | B23K 26/032 219/121.63 |
| 6,789,299 B1 * | 9/2004 | Kidder | B23B 29/20 29/39 |
| 7,002,100 B2 | 2/2006 | Wu et al. | |
| 7,223,935 B2 * | 5/2007 | Wessner | B23K 26/0643 219/121.64 |
| 2004/0238504 A1 | 12/2004 | Aubry et al. | |
| 2005/0150876 A1 * | 7/2005 | Menin | B23K 26/0884 219/121.63 |
| 2006/0096965 A1 | 5/2006 | Antoine et al. | |

FOREIGN PATENT DOCUMENTS

| | | |
|---|---|---|
| DE | 9419673 | 2/1995 |
| DE | 19613377 B4 | 6/2006 |
| JP | S 61164738 A | 7/1986 |

OTHER PUBLICATIONS

Franz Wiesner, Laserintegration in ein CND-Dreh-Fraeszentrum, F & M, 1994, pp. 390-392, v. 102, Munchen, Germany.

* cited by examiner

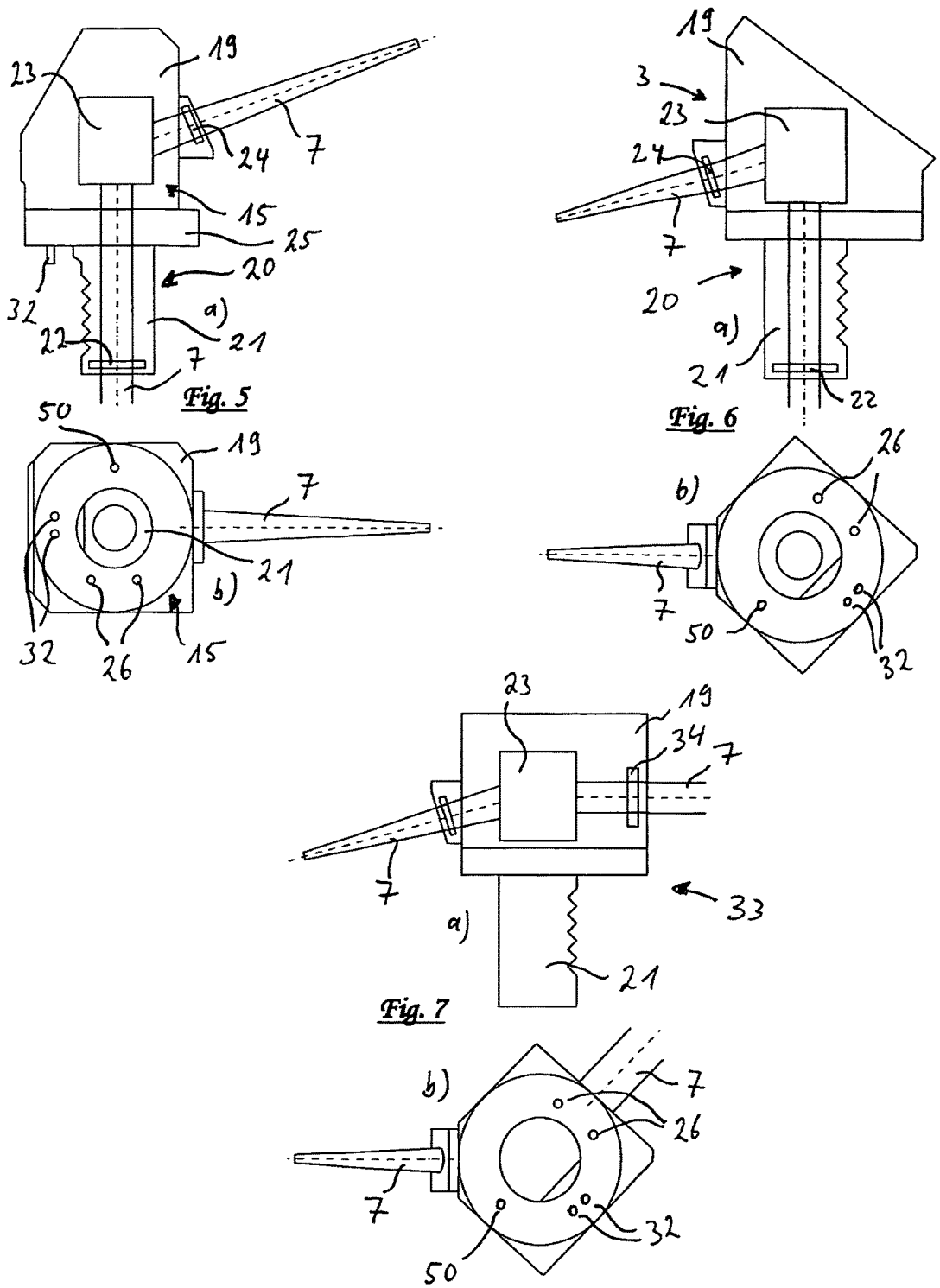

TOOL-CHANGING CARRIER AND TOOL SYSTEM

The invention relates to a tool change carrier having the features in the preamble of claim 1 and to a tool system having the features in the preamble of claim 9.

A tool change carrier is understood to mean a tool carrier by way of which different tools can be moved temporally in succession into a machining position by a relative movement with respect to a workpiece holder, in particular in order to exchange one machining tool for another for a subsequent machining operation. A tool change carrier and a tool system of the abovementioned type for lathes are known for example from DE 196 133 377 B4. A tool turret is disclosed therein as the tool change carrier that belongs to the system, it being possible by way of said tool turret to move different exchangeable tools successively into a machining position by suitable rotation of the turret in order to act on a workpiece. Machining of the workpiece by means of electromagnetic radiation is not disclosed.

U.S. Pat. No. 7,002,100 B2 discloses an apparatus in which a cutting tool and laser radiation are used in combination to machine the workpiece. To this end, a tool carrier, which carries both the cutting tool and the laser, is moved relative to the workpiece to be machined for the machining operation. In the case of laser-assisted cutting, the material to be machined can be softened by the laser prior to the engagement of the cutting tool. The tool support of this prior art is not a tool change carrier comprising a tool turret.

The solution disclosed in U.S. Pat. No. 7,002,100 B2 and similar solutions provide little flexibility with regard to the use of electromagnetic radiation to machine the workpiece or for supportive exposure to radiation. Replacing the laser beam tools is generally complicated. If a laser tool is intended to be retrofitted into an available machine tool, this is usually associated with loss of working space. Often, the optical system is not protected against contaminants and damage by metal chips and cooling lubricant during conventional cutting, or such protection is complicated and installed with a loss of working space.

DE 41 13 633 A1 discloses a machining apparatus having two sleeves. One of the sleeves comprises a radiation channel and a laser machining head, while the second sleeve has a milling head. Both sleeves are driven via a common drive spindle. A workpiece can be machined successively by the laser machining head and by the milling head, with the workpiece being moved relative to the machining apparatus. Said document discloses removing the laser machining head for machining with the milling head, since said laser machining head can impede milling. A tool turret is not disclosed therein. According to the principle of this prior art, the setting up of further tool receptacles would entail a considerable space requirement.

JP 61164738 discloses a machine tool, in which different tool heads can be inserted into one and the same tool receptacle. Said document discloses providing a tool magazine which may for example comprise a laser machining head and a cutting tool. A tool change carrier within the meaning of the present invention having at least two tool receptacles is not disclosed thereby.

U.S. Pat. No. 5,367,061 discloses a machine tool having a single spindle which has a passage for laser radiation and allows alternate machining of a workpiece by means of laser radiation and a mechanical cutting tool. A tool change carrier having at least two tool receptacles is not disclosed therein. For reworking with alternating tool heads, the tool heads have to be continuously changed in the single tool receptacle. This procedure is time-consuming and thus costly.

The invention is based on the object of providing a tool change carrier and a tool system of the type mentioned at the beginning, which allows flexible machining using electromagnetic radiation in machine tools.

This object is achieved, in the case of a tool change carrier and tool system of the type mentioned at the beginning, by way of the characterizing features of claims 1 and 9, respectively.

Advantageous configurations of the invention are provided in the dependent claims.

A tool change carrier which is a tool turret having a turret rotation unit which is arranged in a rotatable manner relative to a main turret body and has at least two tool receptacles, said tool change carrier having means for guiding electromagnetic radiation, makes it possible in a particularly advantageous manner to use optical tool heads which allow the use of electromagnetic radiation, in particular laser radiation, for machining a workpiece. With the arrangement of an optical tool head on such a tool change carrier, separate assembly outlay or a structure for the installation thereof outside the tool change carrier is dispensed with, and as a result the loss of working space is kept to a minimum. If the tool change carrier is provided with a unitary, in particular standardized, tool receptacle, and if the at least one optical tool head has a tool holder for engagement in such a tool receptacle, the installation and changing of the optical tool can be carried out particularly easily and quickly.

The optical tool head can interact with further tools which are arranged outside the tool change carrier, for example with cutting tools, welding apparatus, for example for carrying out hybrid welding processes, or material feeding units, for example for feeding and/or positioning filler material(s), for example a wire for laser coating processes.

However, it is also possible to integrate further functions and tools, for example of the cutting type or for feeding filler material(s) or for welding, in the optical tool head itself.

It may be advantageous to form pairs of an optical tool head with a further tool head carried by the tool change carrier, the two tool heads acting simultaneously or alternately in a coordinated manner on a workpiece. The further tool head can be for example likewise an optical tool head or carry a cutting tool or be a welding tool head for welding the workpiece. As a further alternative, the further tool head can also serve for feeding material, for example for feeding an additional material in the case of a tooling operation carried out by means of the optical tool head, for example a laser welding process, a soldering process, a wire-based laser coating process or a laser build-up welding process. For this purpose, the tool head can have for example a wire feeding and/or wire positioning unit, preferably of the electromechanical type, by way of which the additional material is transported to the machining point.

The tool change carrier can also carry a plurality of coordinated pairs of tool heads, for example one pair for machining the end side of a workpiece and a second pair for the external cylindrical machining of another or the same workpiece. In this case, the respective optical tool head can be set up for example such that the electromagnetic radiation used machines the workpiece directly before the cutting tool, for example for softening purposes. It is also conceivable for a tool head to interact alternately with two adjacent tool heads, for example an optical tool head interacting with a first cutting tool head, for example carrying a milling cutter, and also with a second cutting tool head, carrying for example a grinding pencil, which is adjacent on the other side. For this purpose, it is possible to alter the optical tool head, preferably under remote control, for example in terms of the orientation of the electromagnetic radiation leaving the tool head initially for interacting with the first and subsequently with the second cutting tool head.

Furthermore, it is also possible to combine a cutting tool head with a plurality of optical tool heads. In the latter case, for example a first laser beam could be used to soften the material and, following the cutting operation, a second electromagnetic beam could carry out a hardening process, for example by means of laser hardening. The optical tools can each be arranged on a separate tool head carried by the tool change carrier. However, one of the optical tools may also be provided away from the tool change carrier.

The electromagnetic radiation can be guided through the tool change carrier to the optical tool head located in the use position, for example via an optical channel configured as a bore. In this case, the bore can be provided for the passage of a free beam, can itself guide the electromagnetic radiation via reflections against the inner wall of the bore or can serve for passing through one or more optical cables. The bore can extend through the main turret body, for example via the longitudinal center axis thereof.

Within a turret rotation unit or turret disk fitted in a rotatable manner on the main turret body, the electromagnetic radiation can be deflected via a central optical unit to the optical tool head located in the use position and if necessary already be collimated. The central optical unit can be flanged to the main turret body having the central shaft, such that the electromagnetic radiation always radiates onto the optical tool head pivoted into the use position. For this purpose, the tool receptacle is designed to be transparent for the electromagnetic radiation used. In addition to the bore formed for the optical path or for receiving optical cables, further bores can be provided for feeding compressed air or shielding gas, for feeding and/or discharging coolants and/or lubricants and for feeding electrical and/or control lines. These media can be guided to the machining site, in a manner known from the prior art, via the turret rotation unit.

However, the central optical unit may alternatively be fixed to the turret rotation unit. Such a solution may be advantageous in particular when the electromagnetic radiation is guided through at a distance from the longitudinal center axis of the main turret body, i.e. in a decentralized manner. For this purpose, the central optical unit can be constructed in an annular or ring-like manner, such that the electromagnetic radiation strikes the central optical unit in each latching position of the turret rotation unit and as a result is deflected toward the site of use.

Alternatively to the beam guidance through the tool change carrier, the electromagnetic radiation can also be guided past the main turret body to the optical tool head. As a result, the beam guidance is less complicated, but may be more susceptible to interference, for example as a result of flying chips. In order to protect the beam guidance, a housing, for example in the form of a tube, extending parallel to the main body may be provided.

In the optical tool head, a tool optical unit for deflecting and/or shaping the electromagnetic beam may be provided, for example a mirror and/or lenses. The beam deflection and/or beam shaping may in this case be adjustable in order to be able to correct the exit direction and the beam shape or to be able to adapt to changing geometric conditions. This adjustability may be mechanical for manual adjustment or else remote-controlled, for example electromechanical. It is also conceivable to use the electromagnetic radiation with a focus setting and/or beam direction which changes during machining, and/or with beam interruption, for example by a pulsed beam.

The change in tool positions on the tool change carrier may be of the electromechanical or hydraulic type. The tools used in addition to the optical tool heads may, if required, be driven, for example in the case of a drill.

The tool system according to the invention is suitable in particular for machining metal components having local anti-wear layers, for example shafts having laser-hardened bearing seats, spindles having laser-coated valve seats or ceramic components, for example bearing shells, which are turned in a laser-assisted manner.

The tool system according to the invention can be installed in known and already available machine tools by replacing the conventional tool change carrier. Supplying electromagnetic radiation via optical cables is generally possible without loss of working space. The automatic sequence of machining steps with the assistance of electromagnetic radiation, in particular laser, using different tools and/or different optical tool heads, is enabled for the first time or is at least more economical as a result of the tool system according to the invention.

Figure 2:
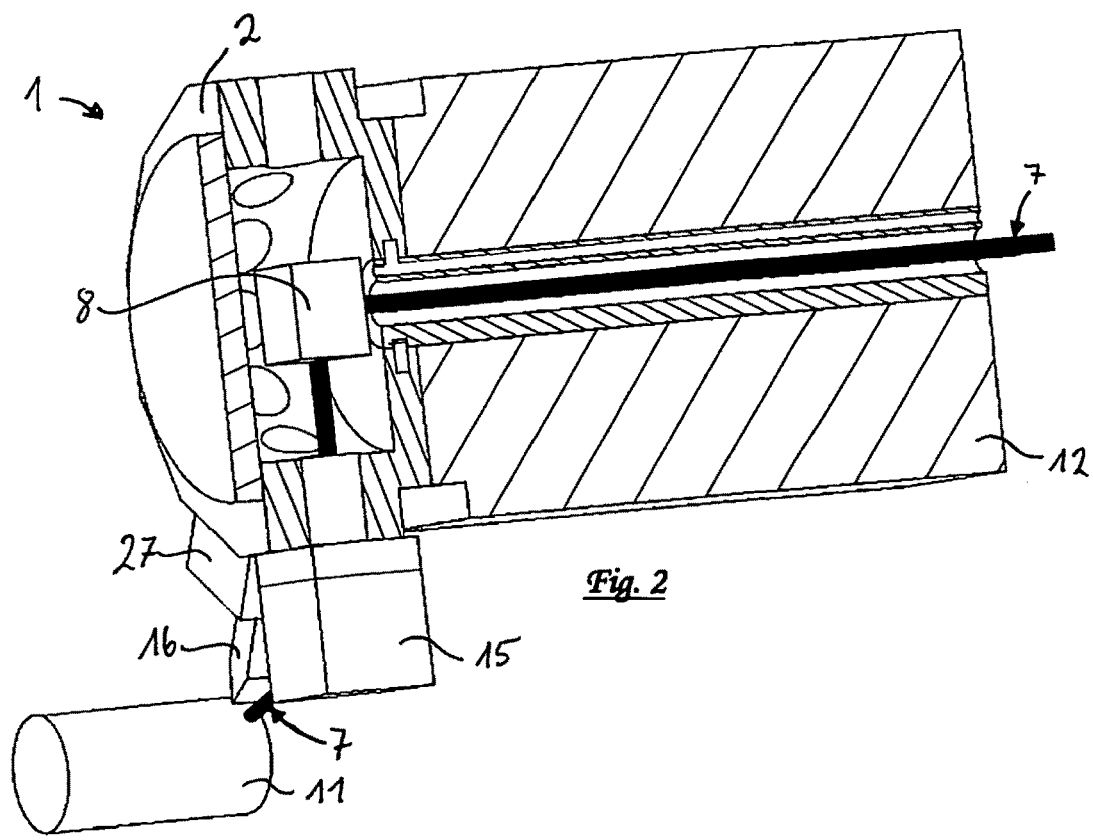
Figure 3:
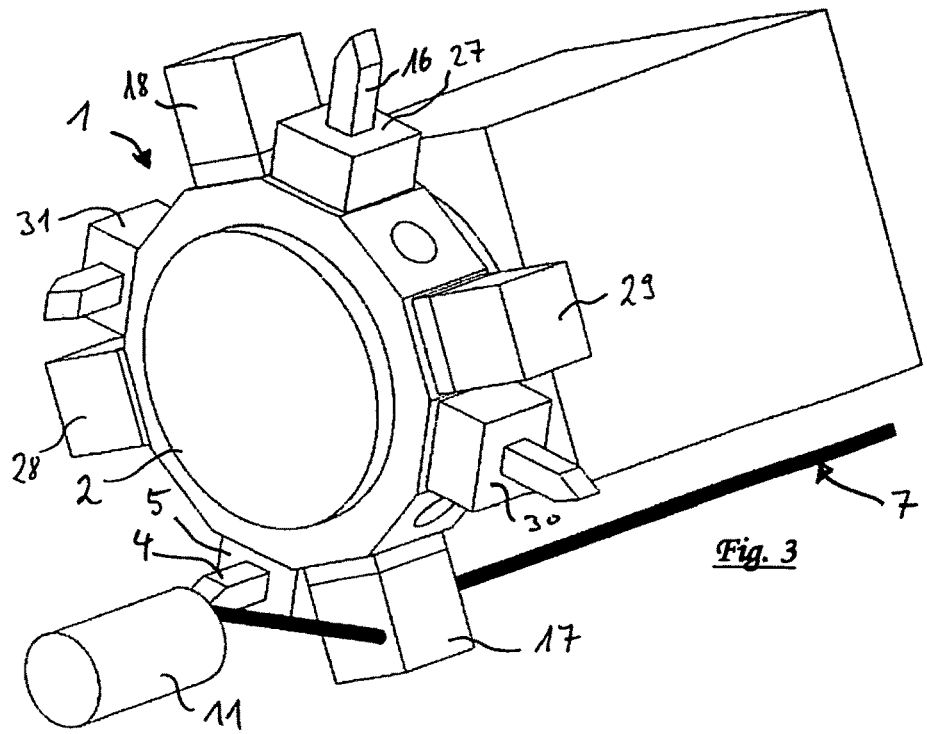
Figure 4:
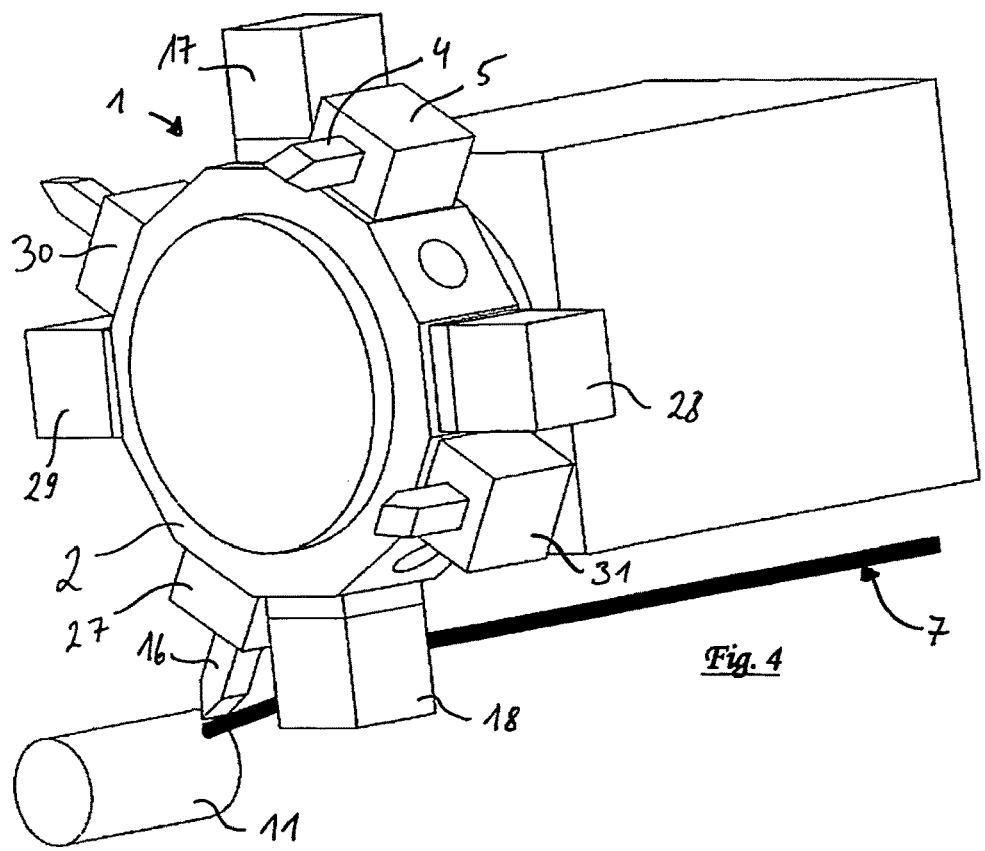
Figure 8:
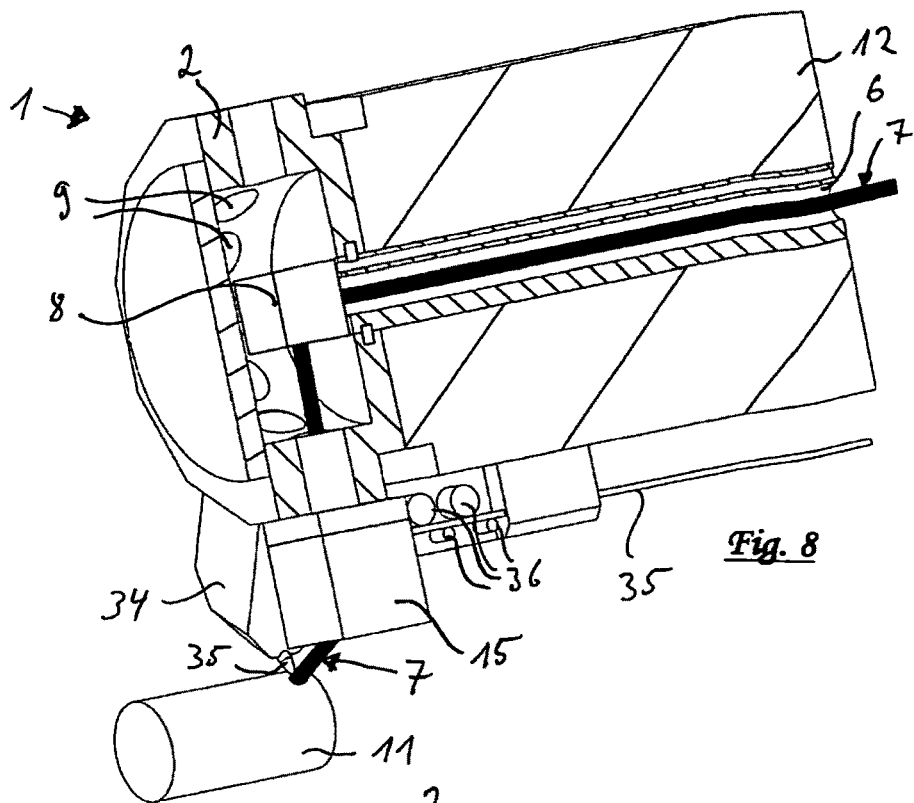
Figure 9:
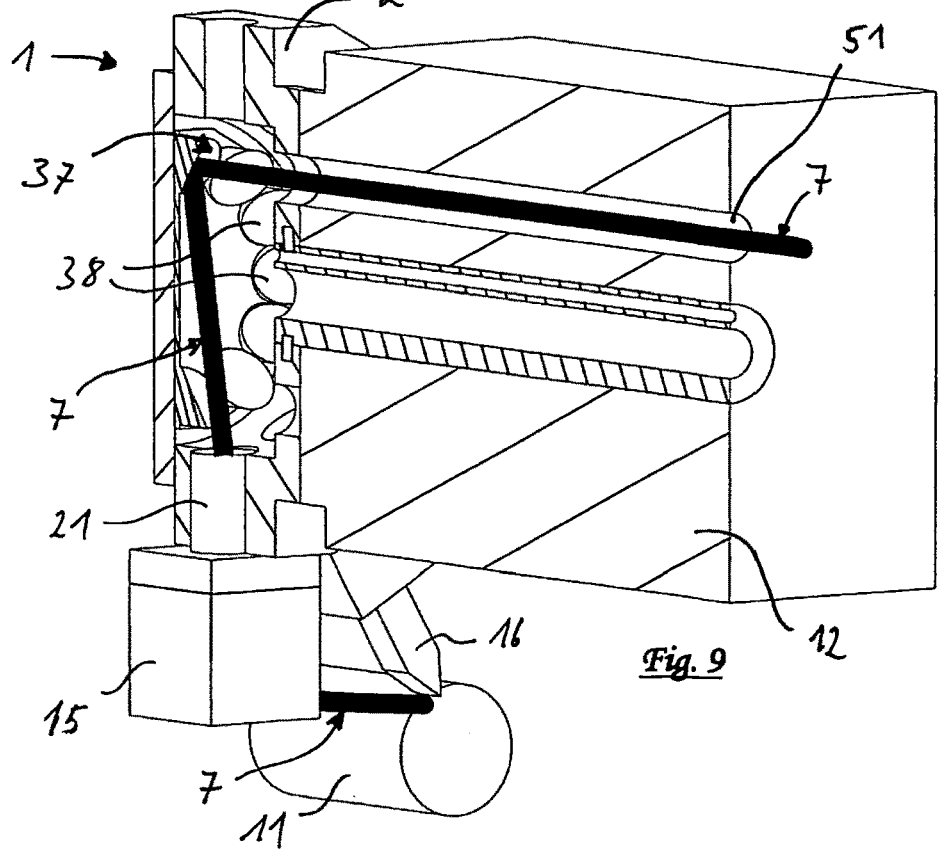
Figure 10:
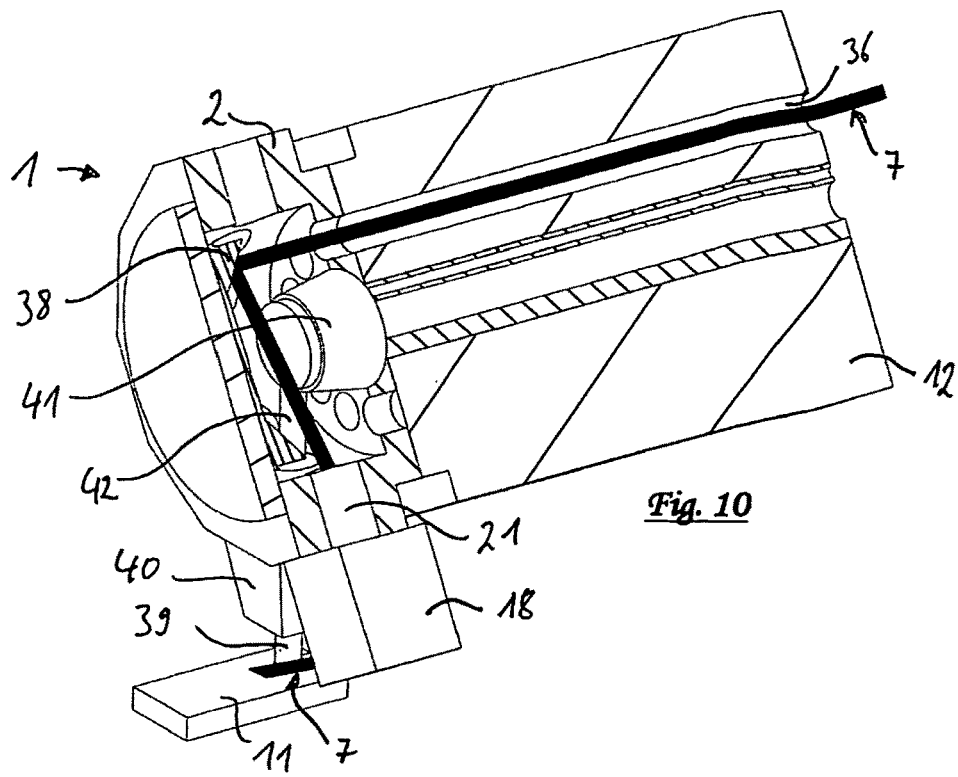
Figure 11:
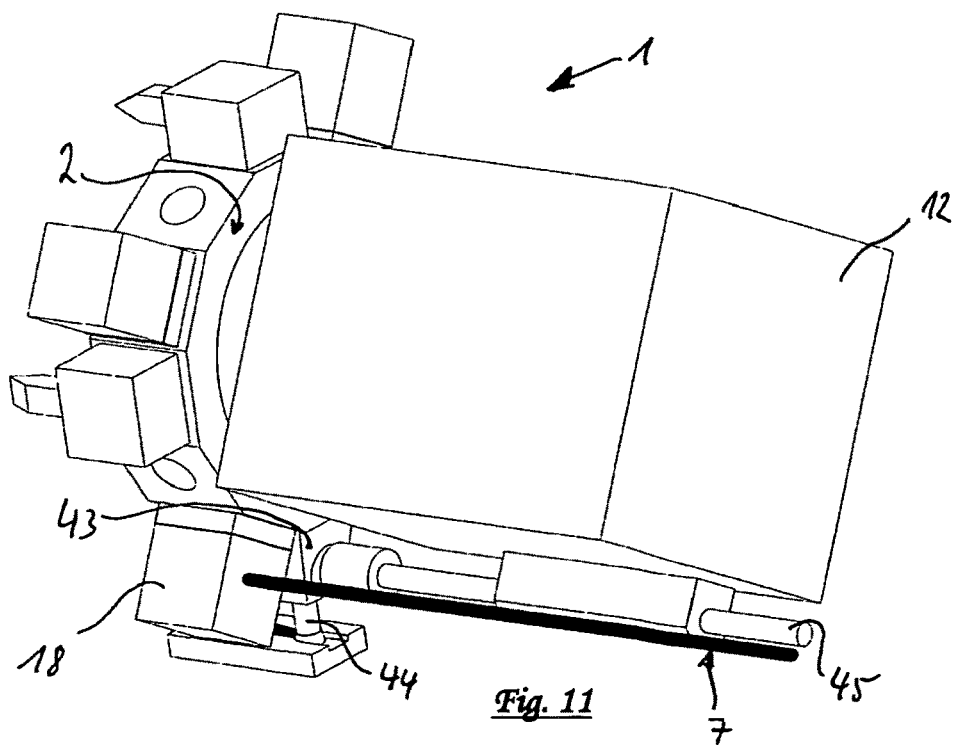

A preferred exemplary embodiment of the tool system according to the invention is illustrated schematically in the following text with reference to figures, in which, schematically:

FIG. 1 shows a perspective cross section through a tool turret with internal beam guidance in the case of the end-side machining of a workpiece, FIG. 2 shows the tool turret according to FIG. 1 in the case of external cylindrical machining, FIG. 3 perspectively shows a tool turret with external beam guidance in the case of end-side machining, FIG. 4 shows the tool turret according to FIG. 3 in the case of external cylindrical machining, FIG. 5 shows a lateral cross section through and a view from below of an optical tool head, FIG. 6 shows a lateral cross section through and a view from below of a further optical tool head, FIG. 7 shows a lateral cross section through and a view from below of a further optical tool head, FIG. 8 shows a tool turret having a material feeding head, FIG. 9 shows a tool turret having decentralized beam guidance, FIG. 10 shows a tool turret having decentralized beam guidance and an internal tool drive, and FIG. 11 shows a tool turret having external beam guidance and an externally guided tool drive.

FIG. 1 shows a perspective cross section through a tool turret 1 having an optical tool head 3 arranged on a turret disk 2 and a cutting tool head 5, having a tool 4, likewise fixed to the turret disk 2.

A laser beam 7 is supplied to the turret disk 2 via a central bore 6 which extends through the rotation axis of a main body 12 of the tool turret 1. This can take place via a separate light guide (not illustrated here) which is connected directly or indirectly to a laser source (likewise not illustrated here). The laser light source can thus be located outside the tool system and also outside a machine tool using the tool system.

After exiting the central bore 6, the laser beam 7 strikes a central optical unit 8 which deflects the laser beam 7 in the direction of the optical tool head 3, for example by means of a mirror (not illustrated here) arranged in the central optical unit 8. The central optical unit 8 may also be formed in a beam-shaping manner, so as for example to collimate or focus the laser beam 7. The turret disk 7 has a multiplicity of tool receptacles 9. The optical tool head 3 and the tool head 5 holding the cutting tool 5 are fixed to two adjacent tool receptacles 9. The tool receptacle 9 holding the optical tool head 3 is designed to be transmissive for the laser beam 7.

The laser beam 7 exiting from the optical tool head 3 and the cutting tool 4 act simultaneously on an end side 10 of a workpiece 11 to be machined. The laser beam 7 serves to assist the machining operation, for example in order to increase the ductility of the workpiece material immediately before the engagement of the cutting tool 4.

Further tools, which are not illustrated in FIG. 1 but are regularly present, are fixed in the remaining tool receptacles 9, such that the machining tool and/or the optical tool head can be changed into the machining position by simple rotation of the turret disk 2 relative to the main turret body 12.

Axial through-passages, in each case for example for compressed air or shielding gas, coolants and lubricants and electrical lines, extend through the tool turret 1 in a manner distributed around the optical channel 6. Only one through-passage channel 13 of these through-passages, for example for the compressed air, is visible in FIG. 1. The through-passage channel 13 ends in a rotary through-passage 14 which allows the passage of the compressed air from the main turret body 12 to the turret disk 2. Within the turret disk 2, the compressed air is guided to one or more exits (not illustrated here) on the circumferential side of the turret disk 2, with the exits being configured in each case such that they supply only a tool located in the use position or a tool head located in the use position.

FIG. 2 shows the tool turret 1 from FIG. 1, with, however, a different optical tool head 15 and a different cutting tool 16 now being in the use position. This optical tool head 15 and the cutting tool 16 on the cutting tool head 27 were brought into the use position by rotation of the turret disk 2 relative to the main turret body 12. The tools 4 and 3 previously used for the end-side machining of the workpiece 11 are no longer illustrated in FIG. 2, but in practice are, of course, still located on the turret disk 2 and have been rotated out of the use position. The central optical unit 8 is also in an unchanged position relative to the main turret body 12 following the rotation and thus does not follow the rotation of the turret disk 2. Only the tool receptacle 9 is supplied with the laser beam 7 said tool receptacle carrying, in its use position, an optical tool head 3 (in FIG. 1) or 15 (in FIG. 2) fixed thereto. If no optical tool head 3 or 15 is located in the use position, the supply of laser radiation to the central optical unit 8 can be interrupted. This can take place automatically via a sensor which is assigned to the turret disk 2 and establishes the relative position with respect to the main turret body 12.

The other optical tool head 15 and the other cutting tool 16 are used for external cylindrical machining of the workpiece 11. This also required a relative movement between the tool turret 1 and the workpiece 11, it being possible for this relative movement to be executed for example by a machine element (not illustrated here) holding the tool turret 1 or by a workpiece spindle (likewise not illustrated).

FIGS. 3 and 4 now schematically show a purely perspective view of a tool turret 1 in the case of end-side machining (FIG. 3) and external cylindrical machining (FIG. 4) of the workpiece 11, it being the case, however, unlike in the exemplary embodiment according to FIGS. 1 and 2, that the laser beam 7 is guided past the housing of the tool turret 1 to the optical tool head 17 (FIGS. 3) and 18 (FIG. 4). The turret disk 2 now has, in addition to the optical tool heads 17 and 18 and the cutting tool heads 5 and 27, further optical tool heads 28 and 29 and further cutting tool heads 30 and 31.

The cutting tools 4 (FIGS. 3) and 16 (FIG. 4) are identical to the cutting tools 4 and 16 in FIGS. 1 and 2. The optical tool heads 17 and 18, however, are adapted to the other laser light supply. The laser beam guidance outside the tool turret 1 reduces the complexity for the optical beam guidance compared with the embodiments in FIGS. 1 and 2, since no separate bore for the laser light supply has to be provided in the tool turret 1. The supply past the tool turret 1 can take place by means of an open optical path, which may also be surrounded by a housing (not shown here), or by means of a light guide, it being the case, however, that both arrangements can be more susceptible to interference from the outside compared with guidance of the laser beam through the tool turret 1.

FIGS. 5 and 6 show two different optical tool heads 15 and 3 for the end-side machining (FIG. 6) and the external cylindrical machining (FIG. 5) of a workpiece (see FIGS. 1 and 2), for the case in which the laser radiation 7, likewise illustrated in FIGS. 5 and 6, is guided through the main turret body 12.

FIG. 5a) and FIG. 6a) show the respective optical tool head 15 and 3 in cross section and FIG. 5b) and FIG. 6b) show it in a view from below.

In the following text, first of all the optical tool head 15 in FIG. 5 is described in more detail. A housing 19 is fixed to a holding unit 20 having a preferably standardized holding element 21 provided for engagement in the tool receptacle 9. The holding element 21 has, on the turret side, a protective glass 22 through which the laser beam 7 can enter the holding element 21 having a continuous bore. Inside the housing 19, the laser beam 7 strikes a tool optical unit 23 which may have for example a mirror (not illustrated here) for radiation deflection. The tool optical unit 23, which may also be formed in a beam shaping, for example focusing, manner, deflects the laser beam 7 through an exit protective glass 24 out of the optical tool head 15.

With the optical tool head 15 mounted, a supporting plate 25 comes to lie on the outer circumference of the turret disk 2 illustrated in FIGS. 1 to 4. The supporting plate 25 contains two cooling connections 26 for feeding and discharging a coolant provided for cooling the optical tool head 15. With the optical tool head 5 inserted, the cooling connections 26 interact with corresponding inputs and outputs (not illustrated in FIGS. 1 to 4) on the turret disk 2.

Furthermore electrical connections 32 are provided, via which an adjustment of the tool optical unit 23, for example with regard to the beam orientation, can be supplied with current and/or be controlled. Corresponding mating contacts (not illustrated) are provided in the turret disk 2 (see for example FIG. 2). A compressed-air connection 50 allows compressed air to be supplied.

The optical tool head 3 illustrated in FIG. 6 differs from that in FIG. 5 merely by way of a different shape of the housing 19 and the exit direction for the tool optical unit 23. Otherwise, reference is made to the description of the corresponding parts in FIG. 5.

FIG. 7 shows an optical tool head 33 as can be used for external beam guidance in a manner corresponding to FIG. 3 or 4. The entry of the laser beam 7 then does not take place via the holding element 21 but via a protective glass 34 in the housing 19. Otherwise, this optical tool head 33 corresponds substantially to the tool heads according to FIGS. 5 and 6, and for this reason reference is made to the corresponding description.

FIG. 8 shows a tool turret 1 similar to the one in FIG. 1 or 2. Identical reference signs designate mutually corresponding parts of the tool turret 1, and for this reason reference is made to the corresponding parts of the description relating to FIGS. 1 and 2. Unlike in FIGS. 1 and 2, the tool turret 1 according to FIG. 8 has a material feeding head 34 by way of which a wire 35 is fed to a machining point on the tool 11. The wire 35 can be for example an additional material for surface coating by means of the laser beam 7. The wire 35 is advanced by means of wire conveying rolls 36. In the material feeding head 34, the wire 35 is directed in the direction of the machining point. The material feeding head 34 can also have means for driving the wire 35.

FIG. 9 shows a tool turret 1 having decentralized beam guidance. This means that the laser beam 7 is not guided through the longitudinal center axis of the main body 12 but through a separate radiation passage 51 that extends through the main body 12. The radiation passage 51 is offset from the longitudinal center axis of the main body, and functions to guide the laser beam 7 through the main body 12 at a distance from the longitudinal center axis. Here too, the laser radiation can be directed through the radiation passage 51 as a free laser beam 7. In the same way, however, it is also possible to guide the laser radiation 7 through the radiation passage 51 by means of optical fibers. In the turret disk 7, the laser radiation 7 strikes an annular central optical unit 37 which is composed of a succession of individual mirrors 38. The minors 38 always direct the laser radiation 7 onto the optical tool head 18 located in the machining position, said optical tool head 18 serving in FIG. 9 for external cylindrical machining of the workpiece 11. For this purpose, the laser beam 7 passes through the holding element 21 for the optical tool head 15. As soon as another optical tool head has been rotated into the machining position, the radiation deflection, provided for this purpose, of the laser beam 7 takes place at another mirror 38. The mirrors 38 can also be formed in a beam-shaping, for example concave, manner for focusing. In FIG. 9, the workpiece 11 is also machined with a cutting tool 16.

FIG. 10 shows a tool turret 1 having decentralized guidance of the laser radiation 7, similar to the tool turret 1 according to FIG. 9. In contrast to the tool turret 1 in FIG. 9, the tool turret 1 according to FIG. 10 has a driven cutting tool 39 on a tool head 40. The driven tool 39 may be for example a milling cutter. A motor 41 for driving the tool 39 is fitted inside the turret disk 2 and, via the main body 12, is supplied with electrical energy in a manner not illustrated here and controlled. The drive is transmitted to the driven tool 39 by means of a transmission rod 42. The motor 41 and the transmission rod 42 are connected to the main turret body 12 and fixed. As a result, different tools can be rotated into the machining position and driven by the motor 41 via a coupling. The laser radiation 7 from the optical tool head 18 can serve to soften the material of the workpiece 11 to be machined.

Finally, FIG. 11 shows a tool turret 1 in which likewise a driven cutting tool head 43 having a driven tool 44 is used. Unlike in FIG. 10, driving takes place via a transmission rod 45 that extends outside the main body 12. At the same time, the optical tool head 18 is used with the laser beam 7 being supplied externally.

LIST OF REFERENCE SIGNS

1 Tool turret
2 Turret disk
3 Optical tool head
4 Cutting tool
5 Cutting tool head
6 Bore
7 Laser beam
8 Central optical unit
9 Tool receptacle
10 End side
11 Workpiece
12 Main turret body
13 Through-passage channel
14 Rotary through-passage
15 Optical tool head
16 Cutting tool
17 Optical tool head
18 Optical tool head
19 Housing
20 Holding unit
21 Holding element
22 Protective glass
23 Tool optical unit
24 Exit protective glass
25 Supporting plate
26 Cooling connection
27 Cutting tool head
28 Optical tool head
29 Optical tool head
30 Cutting tool head
31 Cutting tool head
32 Electrical connection
33 Optical tool head
34 Material feeding head
35 Wire
36 Radiation passage
37 Annular central optical unit
38 Mirror
39 Driven tool
40 Tool head
41 Motor
42 Transmission rod
43 Driven tool head
44 Driven tool
45 Transmission rod
50 Compressed-air connection
51 Radiation passage

The invention claimed is:

1. A tool system, comprising:
a tool change carrier having a plurality of tool receptacles (9), and
a plurality of tool heads (3, 5, 15, 17, 18, 27, 34, 40, 43), each of the plurality of tool heads being set up for fixing to a respective one of said plurality of tool receptacles (9),
wherein said tool change carrier is a tool turret (1) having:
a main turret body (12) with a longitudinal center axis,
a turret rotation unit (2) having said plurality of tool receptacles (9) disposed thereon, said turret rotation unit (2) being arranged in a rotatable manner, for rotation about the longitudinal center axis, relative to said main turret body (12), and
a radiation guide for guiding an electromagnetic radiation beam (7) through said main turret body (12) and the turret rotation unit (2),
wherein said radiation guide comprises a radiation passage (51), in said main turret body (12), said radiation passage (51) being offset from said longitudinal center axis of said main turret body (12) so as to guide the electromagnetic radiation beam (7) through said main turret body (12) at a distance from said longitudinal center axis of said main turret body (12), wherein said radiation guide further comprises a central optical unit (37) within said turret rotation unit (2), wherein said central optical unit (37) is annular and comprises a plurality of individual mirrors (38) operable to direct said electromagnetic radiation beam (7), after it has been guided through said radiation passage (51) to said turret rotation unit (2), towards a respective one of said plurality of tool receptacles (9), wherein said plurality of tool receptacles (9) are transmissive for said electromagnetic radiation beam (7), wherein at least one of said plurality of tool heads (3, 5, 15, 17, 18, 27, 34, 40, 43) is an optical tool head (3, 15, 17, 18) suitable for irradiating a workpiece (11) with said electromagnetic radiation beam (7), and the at least one optical tool head (3, 15, 17, 18) has a respective tool optical unit (23) for deflecting or shaping said electromagnetic radiation beam (7).

2. The tool system claimed in claim 1, wherein each respective tool optical unit (23) is remotely adjustable.

3. The tool system claimed in claim 1, wherein said central optical unit (37) is rotatable relative to said main turret body (12).

4. The tool system claimed in claim 1, wherein said central optical unit (37) is rotationally fixed relative to said turret rotation unit (2).

5. The tool system claimed in claim 1, wherein said radiation guide further comprises at least one optical channel (6) extending through said tool change carrier.

6. The tool system claimed in claim 1, further comprising at least one conduit for feeding media to said plurality of tool receptacles (9).

7. The tool system claimed in claim 1, wherein at least one of said plurality of tool heads (3, 5, 15, 17, 18, 27, 34, 40, 43) is formed as a mechanical cutting tool head (5, 27, 40, 43) having a respective mechanical cutting tool (4, 16, 39, 44) mounted thereto for cutting the workpiece (11).

8. The tool system claimed in claim 1, wherein at least one of said plurality of tool heads (3, 5, 15, 17, 18, 27, 34, 40, 43) is a welding tool head (3, 5, 17, 18).

9. The tool system claimed in claim 1, wherein
at least one of said plurality of tool heads (3, 5, 15, 17, 18, 27, 34, 40, 43) is a welding tool head (3, 15, 17, 18), and
at least one of said plurality of tool heads (3, 5, 15, 17, 18, 27, 34, 40, 43) is a material feeding tool head (34).

10. The tool system claimed in claim 9, wherein at least one of said plurality of tool heads is a mechanical cutting tool head (5, 27, 40, 43).

11. The tool system claimed in claim 1, wherein said plurality of tool heads (3, 5, 15, 17, 18, 27, 34, 40, 43) are fixed to respective ones of said plurality of tool receptacles (9) so as to be adjacent to one another, and
corresponding pairs of the plurality of tool heads (3, 5, 15, 17, 18, 27, 34, 40, 43) are oriented in a suitable manner for jointly machining the workpiece (11).

* * * * *